United States Patent
Papadelis et al.

(10) Patent No.: US 10,970,861 B2
(45) Date of Patent: Apr. 6, 2021

(54) METHOD OF DETERMINING A TRANSFORMATION MATRIX

(71) Applicant: Axis AB, Lund (SE)

(72) Inventors: Aras Papadelis, Lund (SE); August Bergoo, Lund (SE); Daniel Stahl, Lund (SE); Simon Jonsson, Lund (SE)

(73) Assignee: AXIS AB, Lund (SE)

( * ) Notice: Subject to any disclaimer, the term of this patent is extended or adjusted under 35 U.S.C. 154(b) by 49 days.

(21) Appl. No.: 16/408,743

(22) Filed: May 10, 2019

(65) Prior Publication Data

US 2019/0370985 A1 Dec. 5, 2019

(30) Foreign Application Priority Data

May 30, 2018 (EP) ..................................... 18174974

(51) Int. Cl.
*G06T 7/30* (2017.01)
*G06K 9/32* (2006.01)
(Continued)

(52) U.S. Cl.
CPC ............ *G06T 7/30* (2017.01); *G06K 9/00201* (2013.01); *G06K 9/00744* (2013.01); *G06K 9/3233* (2013.01); *G06T 7/20* (2013.01)

(58) Field of Classification Search
CPC combination set(s) only.
See application file for complete search history.

(56) References Cited

U.S. PATENT DOCUMENTS

| 9,599,706 B2 | 3/2017 | Zeng et al. |
| 2007/0055446 A1* | 3/2007 | Schiffmann .......... G01S 7/4026 |
| | | 701/301 |

(Continued)

FOREIGN PATENT DOCUMENTS

EP       2660624 A1    11/2013

OTHER PUBLICATIONS

Wang, Tao et al. "Integrating Millimeter Wave Radar with a Monocular Vision Sensor for On-Road Obstacle Detection Applications," Sensors, 2011, <www.mdpi.com/journal/sensors>, 17 pages.

(Continued)

*Primary Examiner* — Omar S Ismail
(74) *Attorney, Agent, or Firm* — Snyder, Clark, Lesch & Chung, LLP (57) ABSTRACT

A method (200) of determining a transformation matrix for transformation of ranging data from a first coordinate system for the ranging sensor to a second coordinate system for an image sensor is disclosed. The method comprises providing (201) a ranging sensor and an image sensor; acquiring (202) a ranging frame sequence, and an image frame sequence; determining (203) points of motion in frames of each acquired frame sequence; for each frame in one of the frame sequences: evaluating (204) if a single motion point has been determined in the frame, and if a single motion point has been determined, evaluating (206) if a single motion point has been determined in a temporally corresponding frame of the other frame sequence and, in that case, pairing (207) the temporally corresponding frames, whereby a set of frame pairs is formed, and determining (209) the transformation matrix based on the set of frame pairs.

18 Claims, 4 Drawing Sheets

(51) Int. Cl.
*G06T 7/20* (2017.01)
*G06K 9/00* (2006.01)

(56) References Cited

U.S. PATENT DOCUMENTS

| | | | |
|---|---|---|---|
| 2010/0017128 A1* | 1/2010 | Zeng | G01S 13/865 |
| | | | 701/301 |
| 2010/0246897 A1 | 9/2010 | Lehning | |
| 2013/0151135 A1 | 6/2013 | Aubrey et al. | |
| 2014/0195138 A1* | 7/2014 | Stelzig | G08G 1/0133 |
| | | | 701/119 |
| 2015/0304634 A1* | 10/2015 | Karvounis | G06K 9/6248 |
| | | | 348/46 |
| 2016/0223647 A1 | 8/2016 | Nichols et al. | |
| 2016/0291145 A1* | 10/2016 | Zeng | G01S 13/723 |
| 2016/0291149 A1* | 10/2016 | Zeng | B60Q 9/008 |
| 2017/0011625 A1 | 1/2017 | Stelzig et al. | |
| 2017/0039765 A1* | 2/2017 | Zhou | G06T 7/55 |
| 2017/0050556 A1* | 2/2017 | Nakashima | F21S 41/663 |
| 2018/0313940 A1* | 11/2018 | Wu | G05D 1/0246 |
| 2019/0279049 A1* | 9/2019 | Doria | G06K 9/00791 |

OTHER PUBLICATIONS

Extended European Search Report issued in corresponding EP Application No. 18174974.8 dated Nov. 14, 2018, 8 pages.

* cited by examiner

METHOD OF DETERMINING A TRANSFORMATION MATRIX

CROSS-REFERENCE TO RELATED APPLICATIONS

This application claims priority to European Patent Application No. 18174974.8, filed May 30, 2018, which is incorporated herein by reference.

TECHNICAL FIELD

The present invention relates to the field of determining transformation matrixes, and in particular transformation matrixes for transformation of ranging data, for instance radar data, from a first coordinate system for a ranging sensor to a second coordinate system for an image sensor.

BACKGROUND

There exist different sensors for imaging a scene. Common sensor types include image sensors, which register light waves and provides a 2D view of the scene; ranging sensors, which send out signals and register echoes thereof to determine at which distance objects in the scene are located. Ranging sensors provide a 2D or 3D view of a scene, but typically in a different space compared to the image sensor.

An image sensor may be adapted to receive different types of light waves including visible light and infra-red (IR) light. Examples of ranging sensors are radar sensors, lidar sensors and sonar sensors.

All sensor types have their advantages and disadvantages. For example, their performance differs in given environments (day, night, rain, sun, etc.) and they provide different types of information (colors, contrasts, distances, object velocities, etc.). Many imaging systems, such as surveillance/monitoring systems, use a combination of different sensors in order to depict a scene. The data collected by the sensors can be combined in many ways and at different stages of the data processing, depending on the purpose of the combination.

For example, ranging sensors can be used to provide additional information to data produced by an image sensor. A problem with combining ranging data and image sensor data is that they are typically collected in different spaces. The ranging sensor, for example a radar sensor, images a space extending horizontally and in depth, while an image sensor images a space extending horizontally and vertically (each space as seen from the sensors).

Thus, the sensor data need to be transformed between the different spaces.

In order to transform sensor data from one coordinate system of one of the sensors to a second coordinate system of the other sensor, a transformation matrix can be determined. The determination of the transformation matrix is based on correlating points of interest in frames acquired (of a common field of view) by each of the ranging sensor and image sensor. Correlating points of interest can be determined by advanced analysis methods such as spatio-temporal similarity processes. These methods may include rotation, translation, and scaling of the sensor data in order to find correlations. The succeeding calculation of the transformation matrix, can be done through many known methods. One example is disclosed in "Integrating Millimeter Wave Radar with a Monocular Vision Sensor for On-Road Obstacle Detection Applications" by Wang et. al (Sensors 2011, 11, 8992-9008).

As discussed, the existing methods of determining a transformation matrix is very computationally heavy and time-consuming. There thus exist a need for a simpler method.

SUMMARY OF THE INVENTION

An aim of the present invention is to provide a method of determining a transformation matrix which is simpler than known methods. A particular aim is to provide a way of determining, in a simple manner, correlating points in data from different sensors, which can be used for determining a transformation matrix for the sensors.

According to a first aspect, these and other objects are achieved, in full or at least in part, by a method of determining a transformation matrix for transformation of ranging data from a first coordinate system for the ranging sensor to a second coordinate system for an image sensor, the method comprising:

providing a ranging sensor and an image sensor having at least partly overlapping field of views, acquiring, by the ranging sensor, a ranging frame sequence, and acquiring, by the image sensor, an image frame sequence, determining points of motion in frames of each of the ranging frame sequence and the image frame sequence, for each frame in one of the ranging frame sequence and the image frame sequence, evaluating if a single motion point has been determined in the frame, and if a single motion point has been determined, evaluating if a single motion point has been determined in a temporally corresponding frame of the other one of the ranging frame sequence and the image frame sequence and, in that case, pairing the temporally corresponding frames, whereby a set of frame pairs of temporally corresponding frames is formed, determining the transformation matrix based on the set of frame pairs.

As used herein, "single motion point" means one and only one motion point.

As used herein, "image sensor" means a sensor that images by means of acquiring light waves, and "ranging sensor" means a sensor that images by means of sending out and register echoes of a signal (such as a light signal, a radio signal or a sound signal).

As discussed in the background section, the act of determining the transformation matrix is known and different methods are well-known to the skilled person. The details of the determination/calculation of the transformation matrix will therefore not be discussed in this application.

The present invention thus provides a novel method of how to determine a transformation matrix for transforming data from a ranging sensor to the image space of data from an image sensor, and in particular a novel method of how to determine correlations on which the determination of the transformation matrix is based.

The image sensor can be an IR sensor, visible light sensor, or any other type of image sensor within the provided definition. Non-limiting examples of ranging sensors are radar sensor, lidar sensor and sonar sensor.

The ranging sensor and the image sensor are each configured to have a field of view of a scene. The field of view for the ranging sensor at least partly overlaps the field of view for the image sensor. In other words, the ranging sensor and the image sensors acquires data from a common part of the scene. It is not necessary for the image sensor and the ranging sensor to be physically positioned within a particular distance from each other, as long as they have an at least partly common view of the scene.

The frame sequences are acquired by the respective sensor in known manners in the art of image processing. Processing algorithms can be applied to the frame sequences before being used in the herein discussed method.

A motion detecting unit, commonly being part of an image processing pipeline, may be used for determining points of motion in frames of each of the ranging frame sequence and the image frame sequence. The motion detecting unit can provide information in the form of coordinates for detected motion in the frames, optionally with information regarding detected object (such as object type) and information regarding velocity of the detected motion.

The ranging frame sequence and the image frame sequence thus become associated with detected motion points. Starting from one of the frame sequences, each frame is evaluated to determine if a single motion point has been determined in that frame. If so, a temporally corresponding frame of the other one of the frame sequences is evaluated to determine if a single motion point has been determined also in that frame. In the case of both temporally corresponding frames including one and only one motion point each, the temporally corresponding frames are associated as a pair and added to the set of frame pairs. Based on this set of frame pairs, the transformation matrix can be determined.

By temporally corresponding frames is meant frames that are acquired at the same time or almost at the same time. Which frames that are temporally corresponding between the frame sequences can be determined based on a time indication of each frame. The time indication is typically included in a standard image processing and can be set using a hardware clock oscillator.

When the transformation matrix has been determined, it can be stored to be accessible for an image processor, which processes frames acquired by the image sensor, and applied to subsequently acquired image frame sequences. The transformed ranging data can for example be used to determine the distance between different points in an image produced from the image frame sequence and this information can be displayed to a user looking at the image. An example of a scenario would be that a user marks two interesting points in a displayed image and is presented (in the display) with the distance between these points (pixels). This scenario can be achieved thanks to the determination of the transformation matrix. The distance may be calculated on demand (i.e. once the points have been selected) by knowing the transformation matrix. No further measurements with the ranging sensor are required for the calculation.

The inventive method can be part of a calibration mode of a camera (for example a surveillance camera) in which the transformation matrix is determined with help from a ranging sensor which can be temporarily located to view the scene. After the calibration mode, and thus after the transformation matrix has been determined, the ranging sensor can be taken away and leave only the camera which now is associated with its transformation matrix.

In one embodiment, each acquired frame (ranging frame or image frame) is associated with a time stamp representing the time of acquire. In that case, a ranging frame and an image frame can be defined to be temporally corresponding if a difference between their associated time stamps is below a predetermined period of time. The time stamp can be set by means of a hardware clock.

The predetermined period of time may be determined based on the frame rate of the ranging frame sequence and/or the frame rate of the image frame sequence.

Moreover, each determined motion point may be associated with an object velocity. The method may in such an embodiment further comprise, for each frame in one of the ranging frame sequence and the image frame sequence, evaluating if the object velocity is below a predetermined velocity threshold, and performing the pairing of the temporally corresponding frames only if the object velocity is below the predetermined velocity threshold.

This limitation in object velocity contributes to a higher chance of pairing true matching objects, i.e. objects being the same in both frames, even when the frame rate between the frame sequences differs (as it typically does). Objects having a high velocity (higher than the threshold) risk moving too far during the time difference between temporally corresponding frames, such that they either is considered to be an insufficient match (and thus requiring unnecessary processing) or move near another motion point and trigger a false match (which can however be considered to be true). Thus, there is a reduced risk of creating bad pairings by introducing the discussed limitation in object velocity.

In one embodiment, the method further comprises defining an area of interest in the field of view for the image sensor and/or in the field of view of the ranging sensor, wherein the act of evaluating if a single motion point has been determined is performed only within the respective area of interest in the frame. The area of interest can for example be a road area, a pedestrian area or any other area that is of interest in the particular scenario. An area of interest may also be defined to avoid other areas that is not interesting. The area of interest may be defined by a user.

Alternatively, or as a complement, the method may comprise defining an area of exclusion in the field of view of the image sensor and/or in the field of view of the ranging sensor, wherein the act of evaluating if a single motion point has been determined is performed only in areas outside the area of exclusion. The area of exclusion may for example be a building, especially in the field of view for the ranging sensor, which may trigger false detections by that signal and echoes are reflected by the building.

In one embodiment, the act of determining points of motion comprises determining a type or position of an object corresponding to the motion, and determining the point of motion only for motion corresponding to objects of predetermined types of object or predetermined positions of motion.

To determine a type or position of an object corresponding to the motion is a known feature part of many motion detection algorithms. For example, a motion detection algorithm can be configured to detect faces, persons, cars, etc. By this embodiment, an imaging system performing the method can be configured to determine points of motion only for motion corresponding to a certain object, e.g. humans. Thereby, a better and/or quicker determination of the transformation matrix can be achieved by that more or less static objects, such as trees and bushes, are not included in the base for the determination.

Also, by this embodiment, objects having a certain position, e.g. being in a lower area of the field of view, can be accounted for in the determination. Thereby, objects in the sky, e.g. birds and moving clouds, are not included in the determination of the transformation matrix. Alternatively, only objects with a certain position, which is for example associated with a road or pavement where objects such as cars and persons are likely to be located, are included in the determination.

In one embodiment, the act of determining points of motion in frames of the ranging frame sequence comprises determining a group of motion detections and determining a single motion point to represent the group of motion detections. For example, an object such as a moving car will result in multiple detection points of the acquired radar frame. This group of detection points are grouped, for example by any known clustering algorithm. The group is in this embodiment represented by the single motion point. The single motion point may be selected from the multiple detection points, alternatively be formed as an additional motion point with a position representative for the group.

In one embodiment, the act of determining points of motion in frames of the image frame sequence comprises determining a bounding volume representing an object associated with the motion. Moreover, the act comprises (in this embodiment) determining a single point of motion representing the motion, to be a position on a lower edge of the bounding volume. The bounding volume can be, e.g., a bounding box or bounding polygon. It is advantageous that the single point of motion is determined to be a position, preferably central position, on the lower edge since it is then may be more likely that the single point of motion lies in a plane that is optimal for the transformation. The plane could be the ground that may be the common plane for which the calculation of the transformation matrix is based on. In the case of a bounding box (rectangle), for example, a central position would correspond to a position in the middle of the lower edge of the bounding box.

Radar and camera systems may be configured differently and in such case other positions on a determined bounding box may be preferred to be used for setting the single motion point.

In one embodiment, the ranging frame sequence and the image frame sequence are acquired simultaneously during a predetermined period of time. This corresponds to a buffering process, where the frame sequences are acquired, stored in a memory and thereafter used for the determination of the transformation matrix.

In another embodiment, the acts performed before determining the transformation matrix are iterated until a predetermined number of frame pairs in the set of frame pairs is reached. For example, the method can be (partly) iterated until the number of frame pair reaches a threshold in the order of hundreds. The specific threshold value can be set based on the specific parameters for each system or each type of system performing the method.

In another embodiment, the method further comprises evaluating the determined transformation matrix to determine if the transformation matrix fulfils a predetermined level of quality, wherein the method is at least partly iterated until it is determined that the transformation matrix fulfils the predetermined level of quality.

In one embodiment, the method further comprises evaluating the set of frame pairs for excluding insufficient pairings. The evaluation may be performed by using a robust estimation method, for example a random sample consensus (RANSAC) method which is a well-known method.

As used herein, "an insufficient pairing" can be a false pairing or a noisy pairing. By false pairing is meant a pairing of motion points that do not correspond to the same motion source. By noisy paring is meant a pairing of motion points that may correspond to the same motion source, but is a bad pairing since too much noise is present in the image sensor data and/or in the radar sensor data. Noise may influence the sensor data such that motion points are difficult to correctly detect and position in radar or image frames.

According to a second aspect, there is provided a non-transitory computer readable storing medium having stored thereon a program for implementing the method according to any one of the embodiment discussed above in connection to the first aspect, when executed on a device having processing capabilities.

According to a third aspect, there is provided a system comprising a ranging sensor arranged to acquire a ranging frame sequence, an image sensor arranged to acquire an image frame sequence, a processing unit arranged to determine points of motion in frames of each of the ranging frame sequence and the image frame sequence, for each frame in one of the ranging frame sequence and the image frame sequence, evaluate if a single motion point has been determined in the frame, and if a single motion point has been determined, evaluate if a single motion point has been determined in a temporally corresponding frame of the other one of the ranging frame sequence and the image frame sequence and, in that case, pair the temporally corresponding frames, whereby a set of frame pairs of temporally corresponding frames is formed, and determine a transformation matrix for transformation of ranging data from a first coordinate system for the ranging sensor to a second coordinate system for the image sensor based on the set of frame pairs.

The system of the third aspect may generally be embodied in the same ways as the method of the first aspect with accompanying features and advantages.

The ranging sensor and the image sensor may be mounted and configured such that their respective field of view at least partly overlap. The sensors do not need to have the exact same field of view or be located at exactly the same position. The sensors may be located separately from each other as long as their field of views overlap to some extent. The sensors do not need to be directed towards the scene in the same direction. In other words, the sensors may image the scene from different angles. For example, the sensors may be located opposite each other and thus be directed towards each other.

The ranging sensor may be one selected from the group of: radar sensor, lidar sensor, and sonar sensor. Sensors based on other ranging techniques may also be used. Some adaption of the disclosed method and system may be required, however all within reach for the skilled person.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION OF EMBODIMENTS

Figure 1:
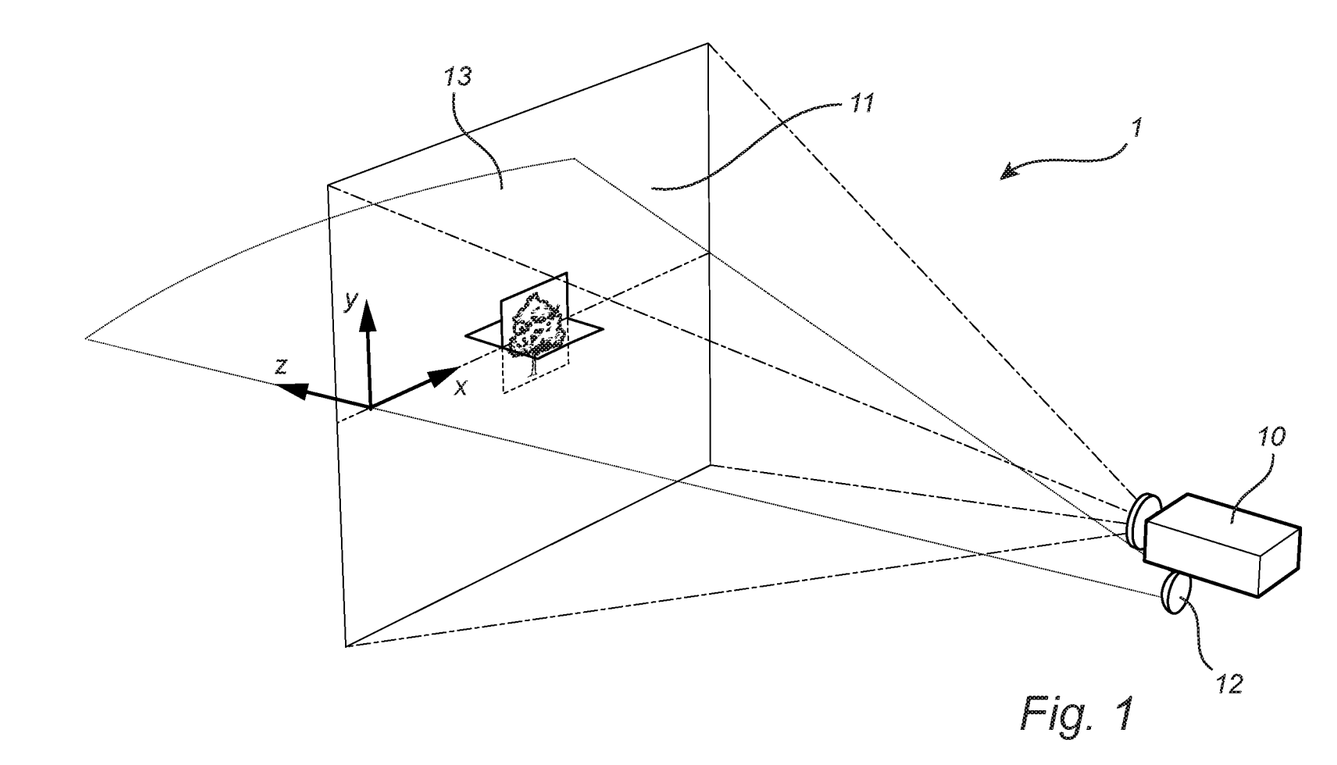
FIG. 1 illustrates a camera and a radar device looking at a scene.

In FIG. 1, a system 1 comprising a camera 10 (comprising an image sensor) and a ranging device in the form of a radar device 12 is illustrated with their respective field of view when looking at a scene. Throughout the detailed description, the radar device 12 will represent the group of ranging devices that can be used for the invention. However, it is appreciated that the radar device 12 may be another type of ranging device, such as a lidar device or sonar device.

The camera's field of view 11 partly overlaps with the radar device's field of view 13. As can be seen, the field of views 11, 13 are located in different spaces. The camera's field of view 11 is located in an image space, and the radar device's field of view 13 is located in a radar space. These spaces can be represented by different coordinate system, a first coordinate system for the first field of view 13 and a second coordinate system for the second field of view 11. The first coordinate system may be a polar coordinate system or a spherical coordinate system, which both are suitable for representing ranging sensor data, and the second coordinate system may be a Cartesian coordinate system, which is suitable for representing image sensor data.

The purpose of combining the radar device 12 and the camera 10 in this manner is to be able to provide additional features to the information that can be provided to a user by the camera 10. The camera 10 can be a surveillance/monitoring camera. In order to add information provided by the radar device 12 to the information provided by the camera 10, a transformation from the data of the radar device 12 needs to be done from the first coordinate system to the second coordinate system. This is achieved through a transformation matrix. The transformation in itself is a well-known process; however, the matrix can be cumbersome to calculate.

Figure 2:
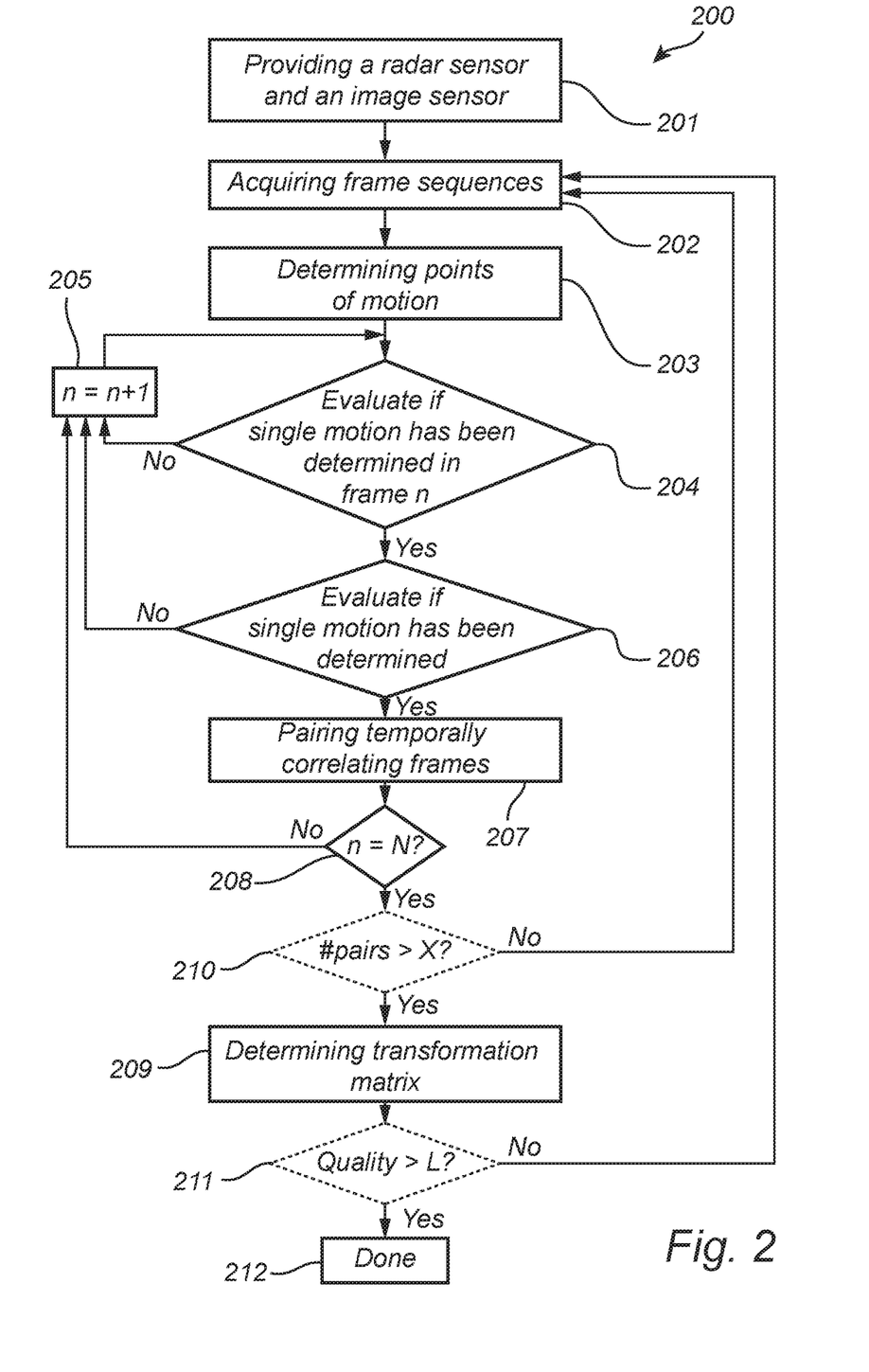
FIG. 2 illustrates a method for determining a transformation matrix.

A method 200 of determining the transformation matrix is illustrated in FIG. 2. The method 200 comprises providing 201 a radar sensor and an image sensor. The radar sensor and image sensor may be mounted and configured such that their respective field of view at least partly overlap, as illustrated in FIG. 1. The sensors do not need to have the exact same field of view or be located at exactly the same position. The sensors may be located separately from each other, and may view the scene from different angles, as long as their field of views overlap to some extent.

The method 200 can be performed in a processor that is located in the camera 10, in the radar device 12, or at another location (e.g. at a server) and accessed by a network connection from the camera 10 and/or the radar device 12. Different acts of the method may be performed by different processors, or in the same processor. The processor may for example be an image processor that is commonly part of an image processing device included in a camera.

The method 200 comprises acquiring 202 frame sequences by the radar sensor and the image sensor. This is performed in conventional manners.

The method 200 comprises determining 203 points of motion in frames of each of the ranging frame sequence and the image frame sequence. A motion detection unit can be used for this purpose. There exist different known motion detection algorithms that can be applied. The motion detecting unit can provide information in the form of coordinates for detected motion in the frames, optionally with information regarding detected object (such as object type) and information regarding velocity of the detected motion.

To represent detected motion in a frame, a bounding volume may be formed for an object of an image frame, for example. The bounding volume may be a bounding box. Other non-limiting examples of bounding volumes are bounding capsule, bounding cylinder, bounding ellipsoid, bounding sphere, bounding slab, bounding triangle, convex hull, discrete oriented polytope, minimum bounding rectangle. For a bounding volume, the point of motion representing the bounding volume can be determined be on an edge of the bounding volume. Preferably, the point of motion is determined to be on a lower edge of the bounding volume, and more preferably on a central position on the lower edge. Thus, it is more likely that the point of motion lies in the plane that is optimal for the transformation.

In a radar frame, multiple motion detections can be represented by a single motion point by a multiple-to-one-point determination included in the determination 203 of points of motion. In this case, motion detections are clustered by use of a conventional clustering algorithm. The clustering may be based on e.g. distance between motion detection points or density of a motion detection point group. The cluster/group of motion points (motion detections) is set to be represented by a single motion point that can be selected from the detections or by forming a new motion point. Known clustering algorithm may be used for clustering motion detections. Alternatively, all motion detections within an area of a predetermined, or dynamically adjusted, size therein may be determined to be represented by the single motion point.

As a complement to a motion detection algorithm, a tracking algorithm (that may be performed by a tracking unit) may be used for tracking determined motion, for example for tracking a specific determined single point of motion that are set to represent a cluster of motion detections. The method 200 comprises starting from either the radar frame sequence or the image frame sequence to evaluate 204 if a single motion point has been determined in the frame. Which sequence to start from can be selected case-by-case or be set to be the same for every time the method 200 is run. The sequence that is likely to include multiple (or no) motion points may be selected as starting sequence in order to avoid unnecessary extra processing.

An iteration of evaluation is performed for the frames in the frame sequences. First, it is evaluated 204 if a single motion point has been determined in frame n which is initially set to a starting value, typically n=1. If a single motion point has not been determined, n is set 205 to n+1 and the next frame, now n, is evaluated 204. If a single motion point has been determined, it is evaluated 206 if a single motion point has been determined in a temporally corresponding frame of the other one of the frame sequences (i.e. not the starting frame sequence).

By temporally corresponding frames is meant frames that are acquired at the same time or almost at the same time. This will be discussed in more detail in connection to FIG. 4.

If a single motion point has not been determined by the evaluation 206, n is set 205 to n+1 and the next frame, now n, of the starting frame sequence is evaluated 204. If a single motion point has been determined by the evaluation 206, the temporally corresponding frames n of the frame sequences are paired and added to a set of frame pairs. The set of frame pairs may be stored temporarily in a memory.

The acts 204-208 are iterated until n reaches N which is evaluated in an act 208. N represents the number of frames to be evaluated in the frame sequences. N may correspond to the actual number of frames in the frame sequences, however that is not necessary.

When the predetermined number of frames N has been evaluated, the set of frame pairs includes associated frame pairs that comprise single motion points and are set to be temporally corresponding frames in the frame sequences.

The method 200 may optionally comprise evaluating 210 if the number of pairs in the frame pairs is above a predetermined number X of frame pairs. For example, the acts 202-208 can be iterated until the number of frame pairs reaches a threshold X in the order of hundreds. The threshold value X can be set specifically for a system or for a type of system performing the method 200. A higher threshold requires a longer determination process and more acquired frames, however the chance for a more correct transformation matrix is probably higher. The balance between these factors should be considered when setting the specific value for the threshold X, and may vary between different system installations.

When the predetermined number X of frame pairs is reached, the set of frame pairs may be evaluated for excluding insufficient pairings. The evaluation may be performed by using a robust estimation method, for example a random sample consensus (RANSAC) method which is a well-known method. An insufficient pairing can be, e.g., a false pairing or a noisy pairing. By false pairing is meant a pairing of motion points that do not correspond to the same motion source. By noisy paring is meant a pairing of motion points that correspond to the same motion source, but is a bad pairing since too much noise is present. After the evaluation, the set of frame pairs include only pairings that is regarded as sufficiently good for the determination of the transformation matrix.

A transformation matrix 209 is then determined based on the set of frame pairs. As discussed in the background section, the act of determining the transformation, given the set of frame pairs (i.e. aligning points between ranging sensor data and image sensor data for temporally corresponding frames), is known and will not be discussed in detail herein.

Optionally, the method 200 may comprise evaluating (not illustrated) if a velocity of an object being corresponding to the detected motion (as provided by the motion detecting unit) is below a predetermined velocity threshold, and performing the pairing 207 on condition that the object velocity is below the predetermined velocity threshold. This act could be performed in different stages of the method 200, for example as a part of evaluating 204 if a single motion point has been determined, or as a separate act just before pairing 207 of temporally corresponding frames.

Optionally, the method 200 may comprise determining the type of an object that is corresponding to the determined motion. This may be done in the radar device 12 and in the camera 10 for frames of the radar frame sequences and the image frame sequence acquired by respective sensor therein. The method 200 may in such an embodiment comprise evaluating if the determined types of object of a radar frame and an image frame (e.g. temporally corresponding radar frame and image frame) of the frame sequences are the same, for example persons or vehicles. If it is determined that the type of object is not the same, the method 200 may comprise discontinuing the current iteration and start the next iteration by setting 205 n to n+1 and starting from evaluating 204 if a single motion has been determined in frame n. The object detection may be performed by known algorithms that are included processors of the radar device 12 and the camera 10, respectively.

Optionally, the method 200 may comprise evaluating 211 the determined transformation matrix to determine if the transformation matrix fulfils a predetermined level L of quality. The evaluation 211 may be performed by testing the transformation matrix on a set of reference images (one radar image and one image sensor image) for which the true correlation between points therein is known. The quality parameter of the transformation matrix can be set to be the deviation between the determined positions by the transformation matrix and the true positions. The predetermined level of quality to be fulfilled can be set to be for, a single transformation matrix (i.e. only a single transformation matrix needs to fulfil the quality level) or for an average of deviation for a sequence of evaluated transformation matrixes. If the evaluation 211 finds that the predetermined level L of quality is not reached, the method 200 may be iterated starting from the act of acquiring 202 (new) frame sequences. If the predetermined level L of quality is reached, determined by the evaluation 211, the method 200 may be regarded finished 212.

It is appreciated that FIG. 2 and the above disclosure provides an exemplary implementation of the inventive method and that other process flows are possible within the scope of the appended claims. Hence, the method 200 may be modified. A non-limiting example of modification is that the frames in the sequence of frames do not need to be evaluated one-by-one (i.e. one in the starting frame sequence, then one in the other frame sequence, and so on), but instead a number of frames in one frame sequence can be evaluated 204 and thereafter a number of frames in the other sequence can be evaluated 206. Another modification is that the frames do not need to be evaluated in the order of n=1, 2, 3, . . . but instead in another order. Another modification is that the acts of the method 200 do not need to be performed in series or one act at a time. Instead, parallel flows of acts and/or multiple acts being performed at the same time is possible to implement. These modifications are all within reach for the skilled person and within the scope of the appended claims.

Figure 3:
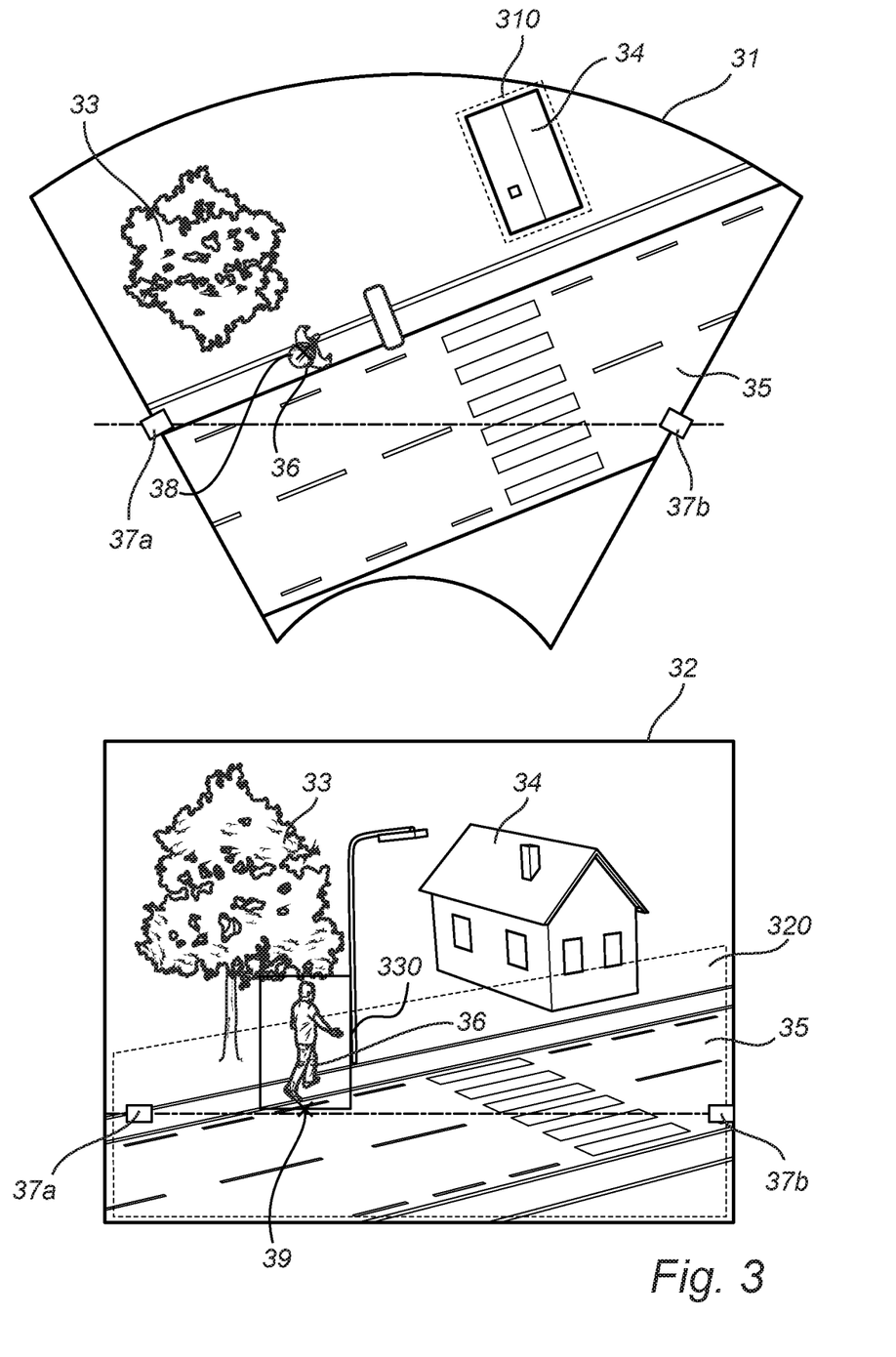
FIG. 3. illustrates a first view of a scene as seen by a radar device and a second view of the scene as seen by a camera.

FIG. 3 illustrates two views: a first radar sensor view 31 that represents what the radar device 12 (of FIG. 1) may depict of a scene, and a second image sensor view 32 that represents what the camera 10 (of FIG. 1) may depict of the same scene. The scene includes a tree 33, a house 34, a road 35, and a person 36 travelling on a sidewalk of the road 35. As explained before, the image space and the radar space cuts into each other and the cutting points 37a, 37b are marked in FIG. 3 to alleviate the understanding of the overlap between the views 31, 32.

Each of the views 31, 32 are represented by a frame in a sequence of frames acquired by the sensors. The radar sensor (in the radar device 12) acquires a radar frame sequence including a radar frame corresponding to the first radar sensor view 31, and the image sensor (in the camera 10) acquires an image frame sequence including an image frame corresponding to the second image sensor view 32. The radar frame and the image frame are temporally corresponding. An example of how to determine temporally corresponding frames will be disclose in detail in connection to FIG. 4.

It is assumed that the person 36 is moving in the field of views for the sensors throughout the acquiring of the frame sequences. Hence, the person 36 represents a moving object. When evaluating the acquired sequence of frames, according to the method 200 presented in FIG. 2, with or without discussed modifications, motion of points for the person 36 will be determined for the frames corresponding to the views 31, 32. In an embodiment where the radar frame sequence is firstly evaluated, the frame corresponding to the radar sensor view 31 will be evaluated and any points of motion in the whole frame will be determined. The determination of points of motion may be preceded by a pre-processing act in which a number of detection points caused by the person 36 is reduced to the single motion point 38.

Next, it is evaluated if a single motion point has been determined in the radar frame, and specifically, as in this embodiment, if a single motion point has been determined in areas outside an area of exclusion 310. In other words, the act of evaluating if a single motion point has been determined is performed only in areas outside the area of exclusion 310. This exclusion may lower the risk for false motion detections which can be caused by reflection of signals or echoes on the house 34 (in this example). The area of exclusion 310 can be set by a user in an installation/setup process of the radar device 12. The area of exclusion may be set in the view for the radar sensor and/or in the view of the image sensor. Since the sensors have different error sources for motion detection, the exclude areas in the different view may be located differently or an exclude area may be set for only one of the view (for either the image sensor or the radar sensor).

Hence, there may be points of motion within the area of exclusion 310, however it will be concluded that a single point of motion 38 has been determined in the frame even if other points of motion lie within the area of exclusion 310.

Since a single motion point 38 is determined in the radar frame, the image frame corresponding to the image sensor view 32 is evaluated. Also for this frame, points of motion have already been determined for the whole frame. The determination of points of motion may be preceded by a pre-processing act in which a bounding box 330 is formed around the detected object (in this case the person 36) and a point of motion 39 is determined to be a central position on a lower edge of the bounding box.

Next, it is evaluated if a single motion point has been determined in the image frame, and specifically, as in this embodiment, if a single motion point has been determined in areas inside an area of interest 320. In other words, the act of evaluating if a single motion point has been determined is performed only in the area of interest 320. This filtering may increase the chance for evaluating only motion points corresponding to objects such as vehicle (moving on a road) and pedestrians/persons (moving on a sidewalk), thus potentially reducing the risk of analyzing uninteresting objects which makes the method 200 more efficient and requiring less processing time and resources. The area of interest 320 may be set by a user in an installation/setup process of the camera 10.

Hence, there may be points of motion located outside the area of interest 320, however it will be concluded that there exists a single point of motion 39 in the frame even if other points of motion lie outside the area of interest 320.

Since the analyzed temporally corresponding radar frame and image frame are determined to each have a single motion point, the frames are paired and stored in a set of frame pairs in which any previously paired frames may be located. Eventually, when for example a predetermined condition has been fulfilled (such as the set of frame pairs reaches a predetermined number of frame pairs), a transformation matrix is determined based on the set of frame pairs.

The transformation matrix may be stored in the camera 10 or be accessible to the camera 10 such that the transformation matrix may be used in the image processing. For the purpose of determining the transformation matrix, the radar device 12 is no longer needed and can be disabled or removed from its location. In one embodiment, the radar device 12 may be used for dynamically updating the transformation matrix, for example with a certain update frequency, to adapt to changes in the acquired sensor data. In the case of a camera with motorized zoom function, the radar device 12 could be used for updating the transformation matrix for the camera after zoom has been performed. Moreover, the radar device 12 may be needed or desired for other purposes which requires the radar device 12 to stay active.

Figure 4:
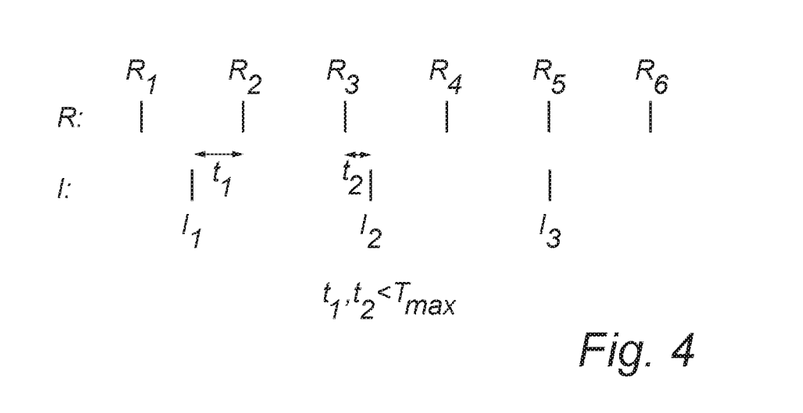
FIG. 4 illustrates frame sequences.

Now turning to FIG. 4, the determination of temporally corresponding frames will be disclosed in detail. FIG. 4 illustrates (part of) two frame sequences R (representing a radar frame sequence) and I (representing an image frame sequence). The first frame sequence R comprises radar frames $R_1$-$R_6$ and the second frame sequence I comprises image frames $I_1$-$I_3$. As can be seen, the first frame sequence R has a higher frame rate (number of frames per second) than the second frame sequence I. The relationship could be the other way around in other embodiments.

A perfect condition for the present method of determining a transformation matrix would be that the frame of the frame sequences R, I would be aligned perfectly in time and captured at the same time, as is the case with radar frame $R_5$ and image frame $I_3$, however not for the other frames of the frame sequences R, I. In practice, the perfect condition is rarely the case since that would require the image sensor and the radar sensor to have the same frame rate (which may not be desirable for other function of the image processing pipeline) and would require a time synchronization between the radar sensor and the image sensor which can be very difficult to achieve and maintain over time. Instead it is defined in the present method a way to determine temporally corresponding frames. By temporally corresponding frames is meant frames that are acquired at the same time or almost at the same time. This can be decided by help of time stamps that are associated with each of the radar frames $R_1$-$R_6$ and the image frames $I_1$-$I_3$. A time stamp can be provided at the acquiring of each frame and is a standard image processing act. A hardware clock oscillator included in each of the camera 10 and the radar device 12 (or in only one of them) may be used for setting the time stamp for each acquired frame.

The definition of temporally corresponding frames could in such an embodiment be that two frames are temporally corresponding if the difference between their time stamps is below a predetermined period of time. In other words, the frames both lie within a predetermined period of time.

In the illustrated embodiment, the time difference (i.e. difference between time stamps) between radar frame $R_2$ and image frame $I_1$ is $t_1$, and the time difference between radar frame $R_3$ and image frame $I_2$ is $t_2$. Both these time differences $t_1$ and $t_2$ are below a predetermined period of time $T_{max}$ thus defining the image frame $I_1$ and the radar frame $R_2$ to be temporally corresponding, as well as the image frame $I_2$ and radar frame $R_3$. The predetermined period of time $T_{max}$ can be set to half of the highest frame rate (or slightly below to avoid that a frame in one frame sequence temporally corresponds to two frames in the other frame sequence) of the frame rates of the frame sequences R, I.

Figure 5:
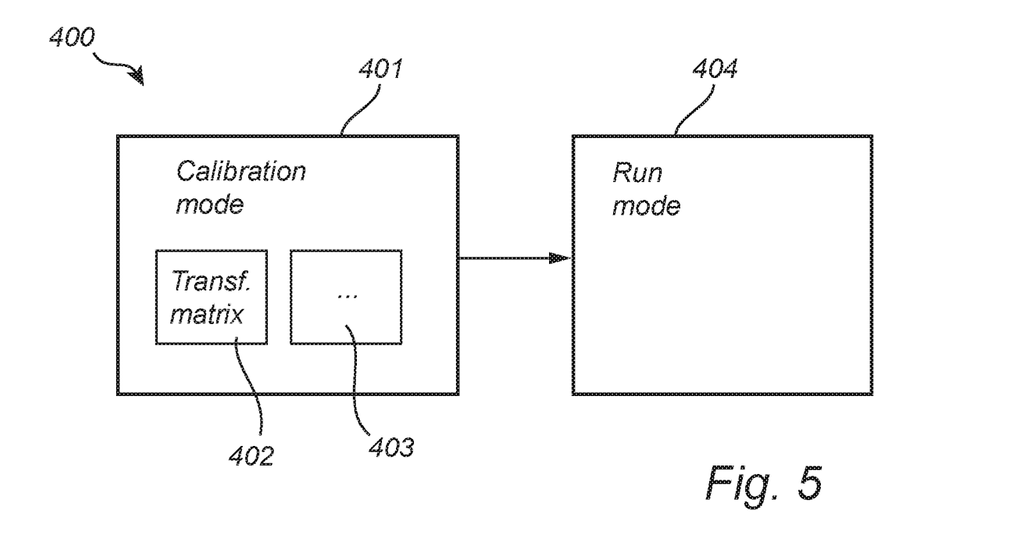
FIG. 5 illustrates a method of different modes for a system.

FIG. 5 is a flow chart showing how the discussed method can be a part of an imaging system setup 400. In a scenario where a camera is to be installed, for example a surveillance camera looking at a parking area, the camera can first be mounted. A radar device is also mounted and configured to have a common field of view with the camera. The system, comprising the radar device including a radar sensor and the camera including an image sensor, are set in a calibration mode 401 in which the method of determining 402 a transformation matrix is included. Other processes 403 may also be part of the calibration mode 401. When the processes 402, 403 of the calibration mode 401 is finished, the system is set in a run mode 404 in which the camera can be used for monitoring the parking area. In some systems, the radar device stays within the system for other purposes than determining the transformation matrix (for which it is not needed in the run mode 404) and in other systems, the radar device is disabled or removed from the system.

The method of determining the transformation matrix is in this application discussed with respect to transformation of ranging data from a coordinate system for the ranging data to a coordinate system for image sensor data. For this type of transformation, the method provides a much simpler and less time-consuming process of determining a transformation matrix when compared to known methods. A translation of ranging data into a coordinate system of image data may also be particular beneficial since some surveillance or monitoring systems already have included a radar sensor and an image sensor. The method can thus be implemented as an additional software component which provides additional benefits without requiring installation of extra hardware.

The person skilled in the art realizes that the present invention by no means is limited to the preferred embodiments described above. On the contrary, many modifications and variations are possible within the scope of the appended claims. For example, the method may be implemented in many different configurations than the ones discussed and illustrated herein. Other types of ranging sensor may be used than the ones discussed herein, and the image sensor may also be of other than the exemplified types. The method is very flexible and can be adapted, without any severe modifications, to suit different types of image and ranging sensor systems.

The invention claimed is:

1. A method of determining a transformation matrix for transformation of ranging data from a first coordinate system for a ranging sensor to a second coordinate system for an image sensor, the method comprising
providing a ranging sensor and an image sensor having at least partly overlapping field of views,
acquiring, by the ranging sensor, a ranging frame sequence, and acquiring, by the image sensor, an image frame sequence,
determining points of motion in frames of each of the ranging frame sequence and the image frame sequence,
for each frame in one of the ranging frame sequence or the image frame sequence,
evaluating if a single motion point has been determined in the frame, and
when a single motion point has been determined, evaluating if a single motion point has been determined in a temporally corresponding frame of the other one of the ranging frame sequence or the image frame sequence and, in that case, pairing the temporally corresponding frames,
whereby a set of frame pairs of temporally corresponding frames is formed,
determining the transformation matrix based on the set of frame pairs,
wherein each determined motion point is associated with an object velocity, and for each frame in one of the ranging frame sequence or the image frame sequence,
evaluating if the object velocity is below a predetermined velocity threshold, and
performing pairing of the temporally corresponding frames in response to the evaluating of the object velocity being below the predetermined velocity threshold.

2. The method according to claim 1,
wherein each acquired frame is associated with a time stamp representing the time of acquire, and
wherein a ranging frame and an image frame are temporally corresponding when a difference between their associated time stamps is below a predetermined period of time.

3. The method according to claim 2, wherein the predetermined period of time is determined based on a frame rate of the ranging frame sequence or a frame rate of the image frame sequence.

4. The method according to claim 1, further comprising
defining an area of interest in the field of view for the image sensor or in the field of view of the ranging sensor,
wherein evaluating if a single motion point has been determined is performed only within the respective area of interest in the frame.

5. The method according to claim 1, further comprising
defining an area of exclusion in the field of view of the image sensor or in the field of view of the ranging sensor,
wherein evaluating if a single motion point has been determined is performed only in areas outside the area of exclusion.

6. The method according to claim 1, wherein determining points of motion comprises
determining a type or position of an object corresponding to the motion, and
determining the point of motion only for motion corresponding to objects of predetermined types of object or predetermined positions of motion.

7. The method according to claim 1, wherein determining points of motion in frames of the ranging frame sequence comprises determining a group of motion detections, and determining a single motion point to represent the group.

8. The method according to claim 1, wherein determining points of motion in frames of the image frame sequence comprises
determining a bounding volume representing an object associated with the motion, and determining a single point of motion representing the motion, to be a position on a lower edge of the bounding volume.

9. The method according to claim 1, wherein the ranging frame sequence and the image frame sequence are acquired simultaneously during a predetermined period of time.

10. The method according to claim 1, wherein the acts performed before determining the transformation matrix are iterated until a predetermined number of frame pairs in the set of frame pairs is reached.

11. The method according to claim 1, further comprising evaluating the determined transformation matrix to determine if the transformation matrix fulfils a predetermined level of quality,
wherein the method is at least partly iterated until it is determined that the transformation matrix fulfils the predetermined level of quality.

12. The method according to claim 1, further comprising evaluating the set of frame pairs for excluding insufficient pairings.

13. A non-transitory computer readable storing medium having stored thereon a program for implementing the method according to 1, when executed on a device having processing capabilities.

14. A system comprising:
a ranging sensor arranged to acquire a ranging frame sequence;
an image sensor arranged to acquire an image frame sequence; and
a processing unit arranged to:
determine points of motion in frames of each of the ranging frame sequence and the image frame sequence,
for each frame in one of the ranging frame sequence or the image frame sequence,
evaluate if a single motion point has been determined in the frame, and
if a single motion point has been determined, evaluate if a single motion point has been determined in a temporally corresponding frame of the other one of the ranging frame sequence or the image frame sequence and, in that case, pair the temporally corresponding frames,
whereby a set of frame pairs of temporally corresponding frames is formed,
wherein the processor is further configured to
determine a transformation matrix for transformation of ranging data from a first coordinate system for the ranging sensor to a second coordinate system for the image sensor based on the set of frame pairs,
wherein each determined motion point is associated with an object velocity,
for each frame in one of the ranging frame sequence or the image frame sequence, evaluate if the object velocity is below a predetermined velocity threshold, and perform pairing of the temporally corresponding frames in response to the evaluation when the object velocity is below the predetermined velocity threshold.

15. The system according to claim 14,
wherein each acquired frame is associated with a time stamp representing the time of acquire, and
wherein a ranging frame and an image frame are temporally corresponding if a difference between their associated time stamps is below a predetermined period of time.

16. The system according to claim 15, wherein the predetermined period of time is determined based on a frame rate of the ranging frame sequence or a frame rate of the image frame sequence.

17. The system according to claim 14, wherein the processor is further configured to
define an area of interest in the field of view for the image sensor or in the field of view of the ranging sensor, wherein the act of evaluating if a single motion point has been determined is performed only within the respective area of interest in the frame; or
define an area of exclusion in the field of view of the image sensor or in the field of view of the ranging sensor, wherein the act of evaluating if a single motion point has been determined is performed only in areas outside the area of exclusion.

18. The system according to claim 14, wherein when determining points of motion in frames of the ranging frame sequence the processor is configured to:
determine a type or position of an object corresponding to the motion, and determine the point of motion only for motion corresponding to objects of predetermined types of object or predetermined positions of motion; or
determine a group of motion detections, and determining a single motion point to represent the group; or
determine a bounding volume representing an object associated with the motion, and determine a single point of motion representing the motion, to be a position on a lower edge of the bounding volume.

* * * * *